United States Patent [19]

Rimkus et al.

[11] 3,952,330

[45] Apr. 20, 1976

[54] ELECTRONIC CONTROL CIRCUIT FOR THE DRIVE MOTOR OF A MAGNETIC SOUND DEVICE

[75] Inventors: Hans-Georg Rimkus, Nurnberg; Ludwig Hess, Hilpolstein, both of Germany

[73] Assignee: Grundig E.M.V.Elektro-Mechanische Versuchsanstalt Max Grundig, Fuerth, Bay., Germany

[22] Filed: Dec. 5, 1974

[21] Appl. No.: 529,715

[30] Foreign Application Priority Data

Apr. 13, 1974 Germany............................ 2418174

[52] U.S. Cl..................................... 360/61; 360/74
[51] Int. Cl.².................... G11B 15/12; G11B 15/48
[58] Field of Search............................... 360/61, 74

[56] References Cited
UNITED STATES PATENTS 3,647,989   3/1972   Mattas................................... 360/74

*Primary Examiner*—James W. Moffitt

[57] ABSTRACT

An electronic control circuit is provided for a magnetic sound device of the type having a sound recording medium transport, a direct current drive motor for the transport, a main control switch, and a circuit interconnecting the motor to a direct current power supply through the main control switch in accordance with a first polarity and an audio circuit. The present circuit comprises an auxiliary control switch interposed between the motor and main switch and a switch circuit including first and second transistor switches connected between the main control switch and motor for reversing the polarity of the interconnection between the power supply and motor. A capacitor is interconnected between the motor and the transistor switches for activating the transistor switches during the charge-up time of the capacitor when the auxiliary switch is open. The present circuit further shorts out the audio circuit for a brief time period after the auxiliary switch is opened or closed.

1 Claim, 1 Drawing Figure

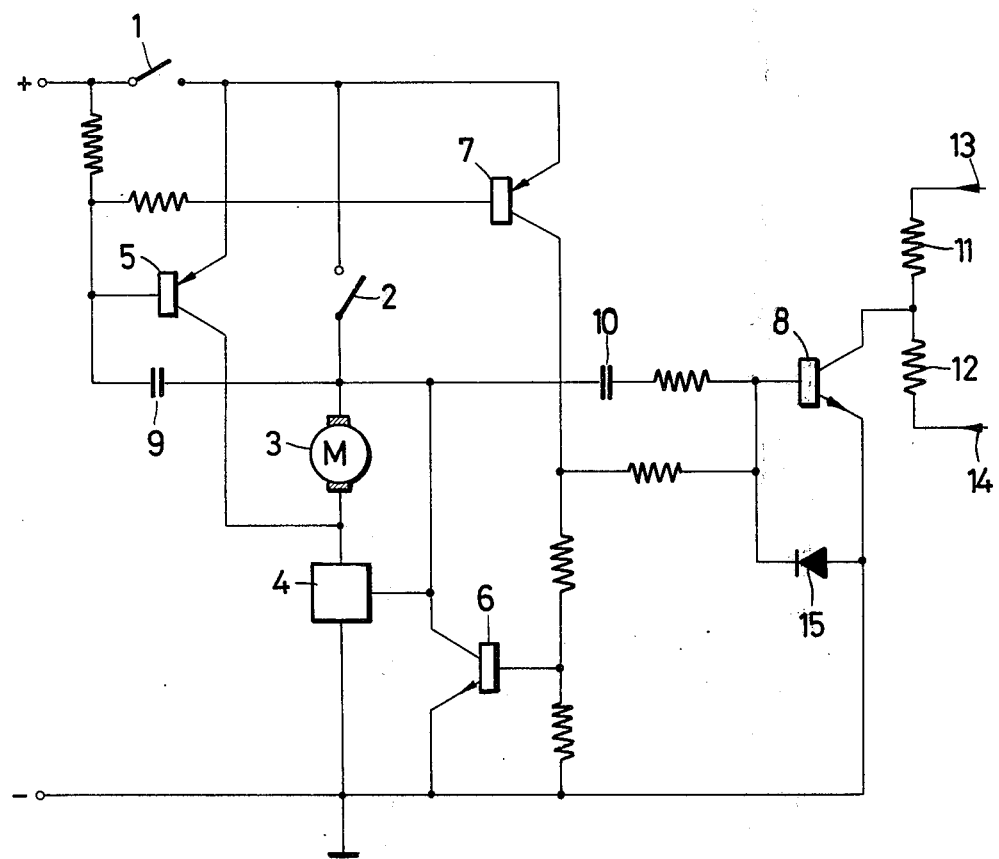

ELECTRONIC CONTROL CIRCUIT FOR THE DRIVE MOTOR OF A MAGNETIC SOUND DEVICE

BACKGROUND OF THE INVENTION

The present invention relates to magnetic sound devices and more particularly to an electronic circuit arrangement for the quick braking of the drive motor of the sound recording medium transport of such a device.

Magnetic sound devices are usually provided with means actuated by a so called "rapid stop" or "pause" switch for short term interruption of the sound recording medium transport. In some tape devices, when the switch is actuated, the rubber pressure roll is lifted from the transport shaft, while the wind-off reel is simultaneously braked. With certain disc devices, the disc platter itself is braked or the transducer head is lifted from the disc. In all cases, a mechanical activity is required which can, of course, be easily executed by pressing a key associated with the switch or by using an electromagnet if the pause function is to be remotely controlled (i.e., through a microphone or foot switch).

Alternately, if an electromagnet cannot be used (e.g., for reasons of cost or space requirements) the current circuit of the drive motor for the transport must be opened or closed respectively as required to stop or start the motor. As a result, periods of continuously changing speed of the sound recording medium arise during acceleration of the motor from zero velocity to its operating speed and during its deceleration from its operating speed down to zero. During these periods of acceleration and deceleration, very noticeable disturbances are generated which obviously must be kept as small as possible. This can be done relatively easily and simply for motor start-up by properly designing the motor and speed control circuit. On the other hand, the deceleration time of the motor depends on the kinetic energy of the inertial mass and on friction and thus poses a special problem.

Heretofore, the drive motor of such devices have been braked electrically, for example by switching off the motor supply voltage while it still rotates and switching in a load resistance so that the motor works as a generator across the resistance. The braking effect becomes even greater when the motor is excited in the opposite direction after switch off. To this end, German Pat. DT-OS No. 2.126.891 suggests that a capacitor be charged while the drive motor is running and that this condenser be switched to the motor in reverse polarity when the supply voltage is switched off from the motor. The problem with this arrangement is that the capacitor must supply the entire braking energy. As a result, it must be relatively large in capacity as well as physical size requiring a device that is not only expensive, but oftentimes cannot be housed within the end product (e.g., small pocket dictating devices). In addition, while sound disturbances of the type referred to previously during starting and stopping are, indeed, considerably shortened in time with such prior art devices, they are not effectively removed.

In view of the above, the principal object of the present invention is to provide an electronic circuit arrangement for the rapid stopping of the drive motor of a magnetic sound device without using electromagnets, large capacitors or other similar, expensive and space consuming elements.

A further object of the present invention is to provide such a circuit which effectively silences the audio frequency voltages during the start-up and braking processes of the drive motor.

SUMMARY OF THE INVENTION

The above and other beneficial objects and advantages are attained in accordance with the present invention by providing an electronic control circuit for a magnetic sound device of the type having a sound recording medium transport, a direct current drive motor for the transport, a main control switch, circuit means interconnecting the motor to a direct current power supply through the main control switch in accordance with a first polarity and an audio circuit. The present circuit comprises an auxiliary control switch interposed between the motor and main switch and switch circuit means including first and second transistor switches connected between the main control switch and motor for reversing the polarity of the interconnection between the power supply and motor. Capacitor means are interconnected between the motor and the transistor switches for activating the transistor switches during the charge-up time of the capacitor when the auxiliary switch is open. The present circuit further includes means for shorting out the audio circuit for a brief time period after the auxiliary switch is opened or closed.

BRIEF DESCRIPTION OF THE DRAWING

The accompanying drawing is a schematic representation of an electronic control circuit in accordance with the present invention.

DETAILED DESCRIPTION OF THE PREFERRED EMBODIMENT

In the accompanying drawing, an electronic circuit in accordance with the present invention is shown connected to the terminals of a direct current power supply. A main switch 1 is connected to the positive terminal of the power supply and to the positive side of the drive motor 3 for the transport system of a magnetic sound device through auxiliary rapid stop — or pause switch 2 which is interposed between switch 1 and motor 3 as shown. Switch 2 may be physically mounted on he chassis of the device or can be installed outside the device as for example, at a microphone, remote switch, or the like location. Switches 1 and 2 are closed during normal operation and the power circuit to motor 3 is completed through a speed control circuit generally designated by the numeral 4. Such circuits are well defined in the art and serve to maintain the constant angular velocity of the motor.

The function of switch 2 is to provide a rapid stop or pause control for the device. That is, when switch 2 is opened, the device will rapidly stop and when switch 2 is closed, the device will start up again.

In accordance with the present invention, means are provided to reverse the current to the motor for a short time period to assist in braking the motor when switch 2 is opened and to short out the audio frequency voltages (record or play back) while the motor is braking or momentarily after the motor is restarted until it builds up to its proper speed.

A first transistor switch 5, second transistor switch 7 and third transistor switch 6 are provided so that when switch 2 is opened for rapid stop, the motor 3 receives a counter voltage for a short time from transistors 5 and 6. The emitter-collector circuits of transistor switches 5 and 6 interconnect the motor with the positive and negative terminals of the power supply but in a reverse polarity to their normal operation. The base of transistor switch 5 and the base of transistor switch 7 are connected to one side of capacitor 9. The emitter-collector circuit of transistor 7 connects the positive terminal of the power supply with the base of transistor switch 6.

A portion of the audio circuit of the device is shown extending from points 13 and 14 and comprising resistors 11 and 12. The juncture of the resistors is connected through the emitter-collector circuit of transistor 8 to ground. The resistors 11 and 12 are chosen within the magnetic head circuit (the details of which are immaterial for the present description). Suffice it to say that when the juncture between resistors 11 and 12 is short circuited, the recorder head is totally inactivated during either recording or reproduction so that no signal is recorded or reproduced.

The base of transistor 8 is connected through a load resistor to the emitter-collector circuit of transistor 7 as shown and is also connected through a load resistor and capacitor 10 to the positive side of motor 3. Thus, when transistor 7 is switched on, or during the charge-up time of capacitor 10, the juncture is grounded. As will be discussed in detail below, this occurs when switch 2 is opened thereby braking motor 3 or immediately after switch 2 is closed and the motor started up.

The operation of the present circuit is as follows. During normal operation, switches 1 and 2 are closed and the motor 3 and its control circuit 4 serve to drive the tape transport as required. When switch 2 is opened, capacitor 9 charges up through the motor and control device. This results in current being applied to the bases of transistors 5 and 7, rendering their emitter-collector circuits conductive. Consequently, current is applied to the base of transistor 6 rendering its emitter-collector circuit conductive so that the polarity of the current applied to motor 3 is reversed through the emitter-collector circuits of transistors 5 and 6. At the same time (i.e., while capacitor 9 is charging), current is applied to the base of transistor 8 through the emitter-collector circuit of transistor 7 thereby shorting out the audio circuit. When capacitor 9 becomes sufficiently charged, current is removed directly from the base of transistors 5 and 7 then hence indirectly from transistors 6 and 8 also.

When the device is to be restarted, switch 2 is closed, completing the circuit to the motor and the motor starts up normally. When switch 2 is closed, capacitor 10 starts to charge and thereby current is applied to the base of transistor 8 so that, once again, the juncture is grounded through the emitter-collector circuit of transistor 8. When capacitor 10 becomes sufficiently charged, it opens the biasing circuit to transistor 8 thereby opening the short circuit and enabling the magnetic head to operate in its usual manner.

A feedback loop including diode 15 extends between the emitter of transistor 8 and its base. This loop facilitates the discharge of capacitor 10 when switch 2 is opened so as not to delay the activating of the silencing circuit.

Thus, in accordance with the present invention, the aforementioned objects are effectively attained.

Having thus described the invention, what is claimed is:

1. In a magnetic sound device of the type having a sound recording medium transport, a drive motor for said transport, a main control switch, circuit means interconnecting said motor to a direct current power supply through said main control switch in accordance with a first polarity and an audio circuit the improvement comprising:

an auxiliary control switch interposed between said motor and main switch, switch circuit means including first and second transistor switches connected between said main control switch and motor for reversing the polarity of the interconnection between said power supply and motor, first capacitor means interconnected between said motor and said transistor switches for activating said transistor switches during the charge-up time of said first capacitor when said auxiliary switch is opened, the emitter-collector circuit of one of said transistor switches extending between one side of said motor and one side of said power supply and the emitter-collector circuit of the other of said transistor switches extending between said power supply and the base of a third transistor switch, said third transistor switch having an emitter-collector circuit extending between the other side of said motor and the other side of said power supply, and, a silencing circuit including a fourth transistor switch having an emitter-collector circuit interconncting said audio circuit with ground whereby to short out said audio circuit and a base connected to (a) the emitter-collector circuit of said second transistor and (b) said main control switch through said auxiliary switch and a second capacitor whereby said silencing circuit is activated during the charge-up time of said second capacitor when said auxiliary switch is closed and during the charge-up time of said first capacitor when said auxiliary switch is opened.

* * * * *